(12) United States Patent
Kang et al.

(10) Patent No.: US 9,366,759 B2
(45) Date of Patent: Jun. 14, 2016

(54) APPARATUS AND METHOD FOR GENERATING DEPTH IMAGE

(75) Inventors: Byong Min Kang, Yongin-si (KR); Kee Chang Lee, Yongin-si (KR); Seong Jin Kim, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 847 days.

(21) Appl. No.: 12/929,805

(22) Filed: Feb. 16, 2011

(65) Prior Publication Data

US 2011/0317878 A1    Dec. 29, 2011

(30) Foreign Application Priority Data

Jun. 25, 2010  (KR) .................. 10-2010-0060597

(51) Int. Cl.
| | |
|---|---|
| G06K 9/00 | (2006.01) |
| G01N 15/06 | (2006.01) |
| G01S 17/89 | (2006.01) |
| G01S 17/10 | (2006.01) |
| G01S 7/486 | (2006.01) |

(52) U.S. Cl.
CPC ............... G01S 17/89 (2013.01); G01S 7/4865 (2013.01); G01S 17/10 (2013.01)

(58) Field of Classification Search
None
See application file for complete search history.

(56) References Cited

U.S. PATENT DOCUMENTS

| | | | | |
|---|---|---|---|---|
| 2007/0237363 A1* | 10/2007 | Hagio | ..................... | G01S 17/36 |
| | | | | 382/106 |
| 2009/0079955 A1* | 3/2009 | Tsunesada et al. | .......... | 356/4.01 |
| 2009/0114802 A1* | 5/2009 | Kang | ..................... | G01B 11/25 |
| | | | | 250/226 |
| 2009/0284731 A1 | 11/2009 | Jin et al. | | |
| 2010/0128109 A1* | 5/2010 | Banks | ............................. | 348/46 |

FOREIGN PATENT DOCUMENTS

| | | | | |
|---|---|---|---|---|
| BE | EP 2116864 A1 * | 11/2009 | .............. | G01S 17/08 |
| DE | 19704496 | 3/1998 | | |
| EP | 2116864 | 11/2009 | | |
| EP | 2116864 A1 * | 11/2009 | | |
| KR | 10-2007-0020005 | 2/2007 | | |
| KR | 10-2009-0046535 | 5/2009 | | |
| KR | 10-2009-0049322 | 5/2009 | | |

(Continued)

OTHER PUBLICATIONS

Extended European Search Report issued Mar. 3, 2014 in European Patent Application No. 11155932.4.

(Continued)

*Primary Examiner* — Kim Vu
*Assistant Examiner* — Fred Hu
(74) *Attorney, Agent, or Firm* — Harness Dickey & Pierce, P.L.C.

(57) ABSTRACT

Provided is a depth image generating apparatus and method. The light-receiving unit may include a first gate and a second gate and a depth calculator to calculate a depth based on first light information through fourth light information. The first gate may obtain the first light information from a reflected light of a light emitted based on a first pulse and the second gate may obtain the second light information from a reflected light of a light emitted based on a second pulse, and then the first gate may obtain the third light information from a reflected light of a light emitted based on a third pulse and the second gate may obtain the fourth light information from a reflected light of a light emitted based on a fourth pulse.

20 Claims, 13 Drawing Sheets

(56) References Cited

FOREIGN PATENT DOCUMENTS

| | | |
|---|---|---|
| KR | 10-2010-0025228 | 3/2010 |
| WO | 2010/013779 | 2/2010 |

OTHER PUBLICATIONS

R. Schwarte et al., "New optical four-quadrant phase-detector integrated into a photogate array for small and precise 3D-cameras", SPIE, vol. 3023, pp. 119-128.

* cited by examiner

FIG. 2
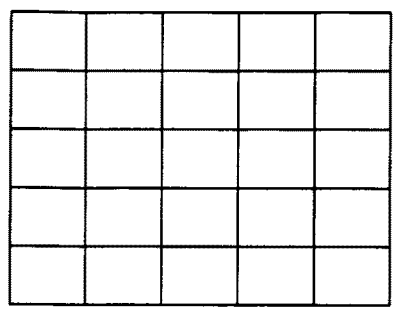
 : PIXEL

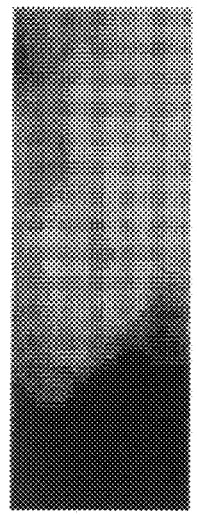
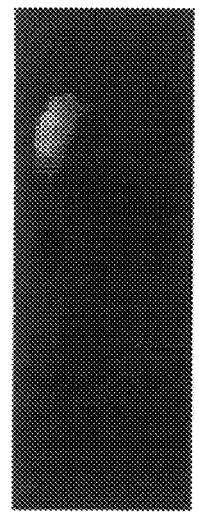
FIG. 6

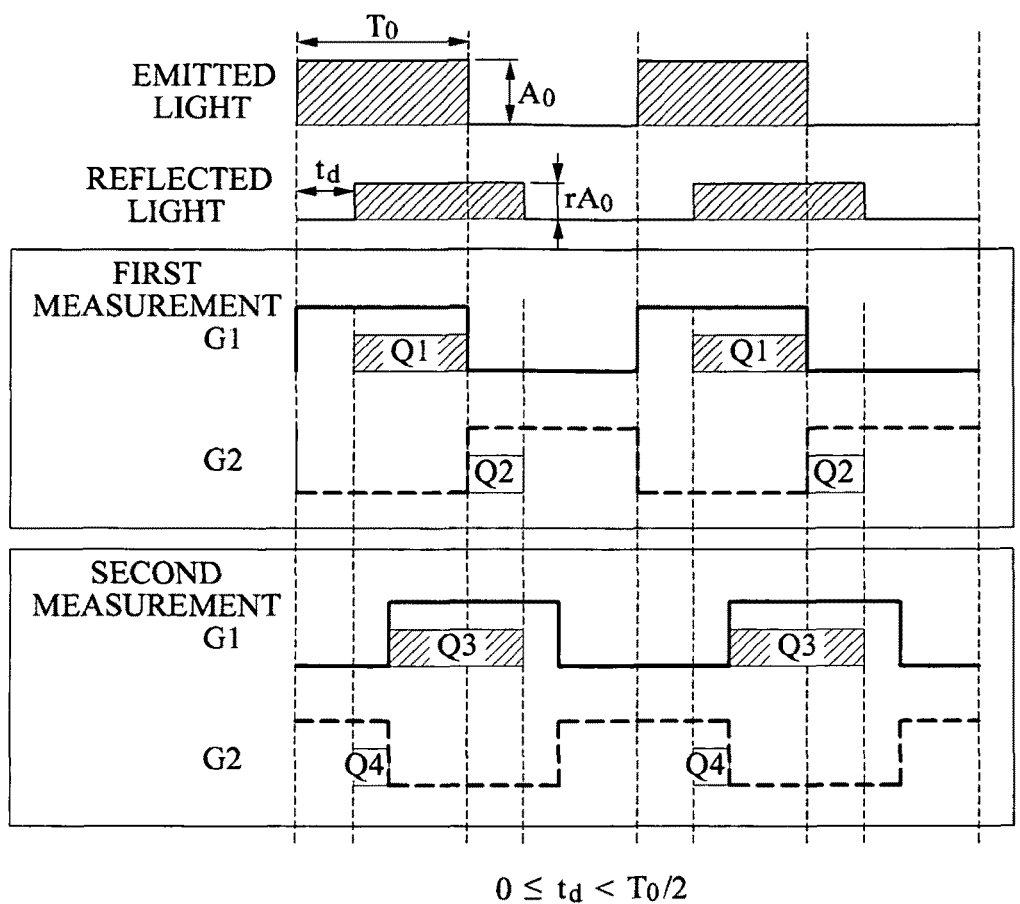

$T_0 \leq t_d < 3T_0/2$ $3T_0/2 \leq t_d < 2T_0$

APPARATUS AND METHOD FOR GENERATING DEPTH IMAGE

CROSS-REFERENCE TO RELATED APPLICATIONS

This application claims the priority benefit of Korean Patent Application No. 10-2010-0060597, filed on Jun. 25, 2010, in the Korean Intellectual Property Office, the disclosure of which is incorporated herein by reference.

BACKGROUND

1. Field

Embodiments relate to a depth image generating apparatus and Method, and more particularly, to a depth image generating apparatus and method that may extend a maximal measurement distance of a depth and may maintain an accuracy of the measured depth.

2. Description of the Related Art

A three-dimensional (3D) image may include a color image and a depth image. The depth image may be obtained based on a time of flight (TOF) scheme. An infrared ray-based depth camera may emit an infrared ray to an object, may sense a reflected light from the object, and may measure a TOF to calculate a distance between the camera and the object. The calculated distance may be used as a depth of the depth image.

When a conventional depth camera measures a distance, a maximal measurement distance is limited and thus, the measured distance may often exceed the maximal measurement distance. In this example, the measured distance may be recorded as a smaller value than the maximal measurement distance. Therefore, sometimes, the conventional depth camera may not accurately measure a distance to the object due to the limited maximal measurement distance. When the maximal measurement distance is extended, an accuracy of the measured distance may decrease.

SUMMARY

In an aspect of one or more embodiments, there is provided a depth image generating apparatus, which may include a light-receiving unit including a first gate and a second gate, and a depth calculator to calculate a depth as the depth of the depth image based on first light information through fourth light information, and the first gate may obtain the first light information from a reflected light of a light emitted based on a first pulse and the second gate may obtain the second light information from a reflected light of a light emitted based on a second pulse, and then the first gate may obtain the third light information from a reflected light of a light emitted based on a third pulse and the second gate may obtain the fourth light information from a reflected light of a light emitted based on a fourth pulse.

A depth calculator may calculate the depth based on a first difference and a second difference, the first difference being a difference between the first light information and the second light information and the second difference being a difference between the third light information and the fourth light information.

A depth calculator may calculate, based on different schemes, the depth for each of a condition where both the first difference and the second difference are greater than or equal to zero, a condition where the first difference is less than zero and the second difference is greater than or equal to zero, a condition where both the first difference and the second difference are less than zero, and a condition where the first difference is greater than or equal to zero and the second difference is less than zero.

One or more embodiments of a depth image generating apparatus may further include a pulse controller to simultaneously provide the first pulse and the second pulse to the first gate and the second gate, respectively, and then, to simultaneously provide the third pulse and the fourth pulse to the first gate and the second gate, respectively.

A phase difference between the first pulse and the second pulse may be 180 degrees, a phase difference between the third pulse and the fourth pulse may be 180 degrees, a phase difference between the first pulse and the third pulse may be 90 degrees, and a phase difference between the second pulse and the fourth pulse may be 90 degrees.

An on-off period of the first pulse may be the same as an on-off period of light emission, and the third pulse may be generated after the light emission, wherein the period of the third pulse is one-half of the period of the first pulse.

A depth image generating apparatus of one or more embodiments may be included in a depth camera.

The first and second gates of a depth image generating apparatus of one or more embodiments may be included in a pixel.

In one or more embodiments of a depth image apparatus, at least one of a shuttering time of the first gate and a shuttering time of the second gate is adjusted to extend a maximal measurement distance and to calculate the depth of the image.

In an aspect of one or more embodiments, there is provided a depth image generating method, which may include obtaining first light information and second light information respectively from a reflected light of a light emitted based on a first pulse and from a reflected light of a light emitted based on a second pulse, obtaining third light information and fourth light information respectively from a reflected light of a light emitted based on a third pulse and from a reflected light of a light emitted based on a fourth pulse, and calculating a depth as the depth of the depth image based on the first light information through the fourth light information.

Calculating based on the first light information through the fourth light information may include calculating the depth based on a first difference and a second difference, the first difference being a difference between the first light information and the second light information and the second difference being a difference between the third light information and the fourth light information.

Calculating based on the first difference and the second difference may include calculating, based on different schemes, the depth for each of a condition where both the first difference and the second difference are greater than or equal to zero, a condition where the first difference is less than zero and the second difference is greater than or equal to zero, a condition where both the first difference and the second difference are less than zero, and a condition where the first difference is greater than or equal to zero and the second difference is less than zero.

The first light information may include a total quantity of electric charge from the reflected light of the light emitted on the first pulse signal; the second light information comprises a total quantity of electric charge from the reflected light of the light emitted on the second pulse signal.

The third light information may include a total quantity of electric charge from the reflected light of the light emitted on the third pulse signal; the fourth light information comprises a total quantity of electric charge from the reflected light of the light emitted on the fourth pulse signal.

The depth may be calculated based on a difference between the first total quantity of electric charge and the second total quantity of electric charge, and based on the difference between the third total quantity of electric charge and the fourth total quantity of electric charge.

In an aspect of one or more embodiments, a depth image generating method may further include adjusting at least one of a shuttering time of the first gate and a shuttering time of the second gate to extend a maximal measurement distance and to calculate the depth.

In an aspect of one or more embodiments, there is provided a depth image generating method, which may include measuring, during a first predetermined time, a first total quantity of electric charge in a first gate from a first reflected light of light emitted on a first pulse control signal, and a second total quantity of electric charge in a second gate from a second reflected light of a light emitted on a second pulse control signal; calculating a first difference between the first total quantity of electric charge and the second total quantity of electric charge; measuring, during a second predetermined time, a third total quantity of electric charge in the first gate from a third reflected light of a light emitted on a third pulse control signal, and a fourth total quantity of electric charge in the second gate from a fourth reflected light of a light emitted on a fourth pulse control signal; calculating a second difference between the third total quantity of electric charge and the fourth total quantity of electric charge; and calculating a maximal measurement distance of a depth as the depth of the depth image based on the first difference and the second.

In an aspect of one or more embodiments, a depth image generating method may further include adjusting at least one of a shuttering time of the first gate and a shuttering time of the second gate to extend a maximal measurement distance and to calculate the depth.

Additional aspects of embodiments will be set forth in part in the description which follows and, in part, will be apparent from the description, or may be learned by practice of the disclosure.

One or more embodiments may include a depth image generating apparatus and method. One or more embodiments of a depth image generating apparatus and method may enhance a maximal measurement distance of a depth more than twice a conventional one, and may enhance an accuracy of the measured depth. One or more embodiments of a depth image generating apparatus may calculate a time taken in a round-trip flight of a light to an object using a change in a quantity of electric charge, and may calculate the depth based on the calculated time and thus, may increase an accuracy of the depth.

A three-dimensional (3D) image may be restored based on a depth image and a brightness image. The depth image and the brightness image may be generated based on a maximal measurement distance that is extended compared with a conventional one and thus, the 3D image may be more realistic and stereoscopic. The brightness image may be obtained by a general two-dimensional (2D) camera or a 3D camera.

Two different brightness images having difference view points may be generated based on a depth image and a brightness image with respect to an object and may be applied to a 3D display device.

According to another aspect of one or more embodiments, there is provided at least one computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which:

FIG. 2 is a diagram illustrating a pixel array of a light-receiving unit according to embodiments.

FIG. 6 is a diagram illustrating an example of an object and a depth image of the object according to embodiments.

FIGS. 8A through 8D are diagrams illustrating an example of a quantity of electric charge generated based on $t_d$ according to embodiments.

DETAILED DESCRIPTION

Figure 1:
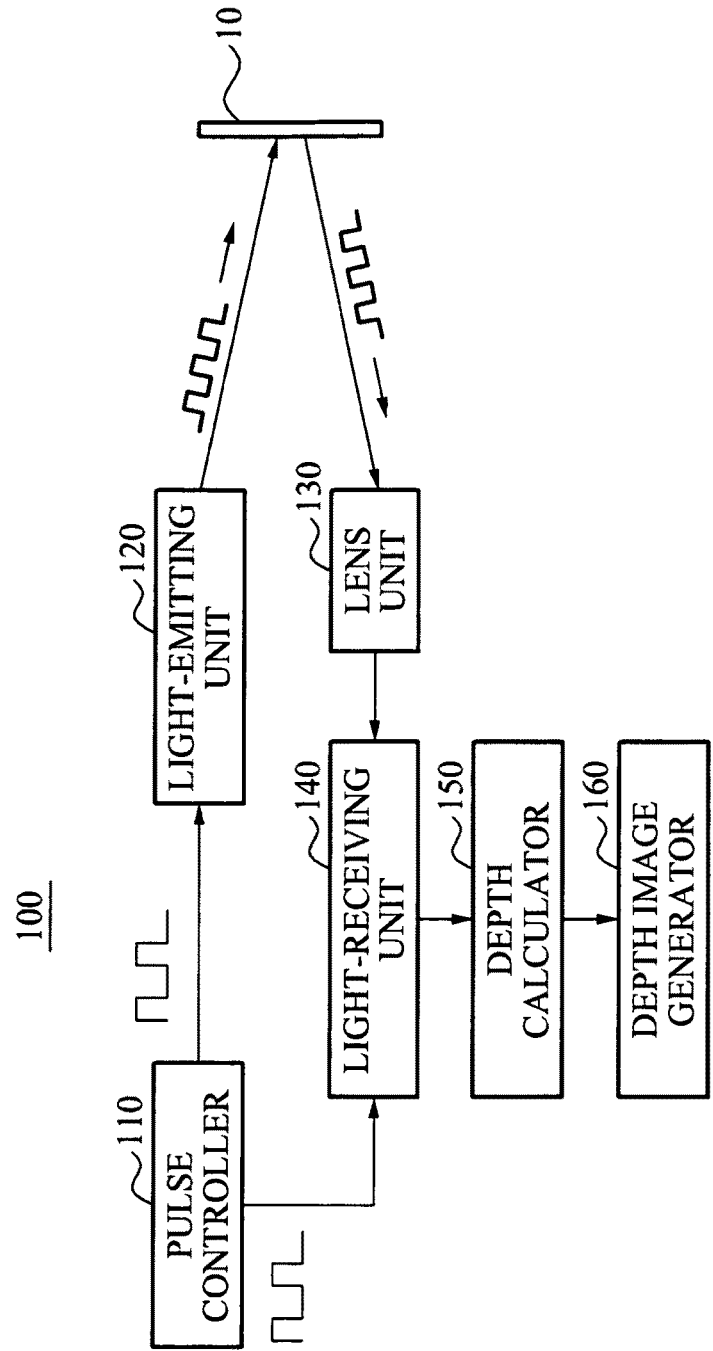
FIG. 1 is a block diagram illustrating a depth image generating apparatus according to embodiments.

Reference will now be made in detail to embodiments, examples of which are illustrated in the accompanying drawings, wherein like reference numerals refer to the like elements throughout. Embodiments are described below to explain the present disclosure by referring to the figures FIG. 1 illustrates a depth image generating apparatus 100 according to an embodiment.

Referring to FIG. 1, the depth image generating apparatus 100 may measure a depth of an object 10 based on a time of flight (TOF) scheme, and may generate a depth image to be used for generating a three-dimensional (3D) image of the object 10. The depth-image generating apparatus 100 may be included in a depth camera.

The depth image generating apparatus 100 may measure a distance to the object 10, namely, a depth of a depth image, based on a pixel unit, using a TOF depth sensor. The depth image generating apparatus 100 may include a pulse controller 110, a light-emitting unit 120, a lens unit 130, a light-receiving unit 140, a depth calculator 150, and a depth image generator 160.

The pulse controller 110 may provide various pulse control signals used for measuring the depth of the object 10, to the light-emitting unit 120 and the light-receiving unit 140. The pulse controller 110 may generate a waveform of a pulse that the light-emitting unit 120 uses to emit a light, namely, a pulse control signal, and may provide the pulse control signal to the light-emitting unit 120. Also, the pulse controller 110 may generate a waveform of a pulse that the light-receiving unit 140 uses to receive a reflected light, namely, a pulse control signal, and may provide the pulse control signal to the light-receiving unit 140.

The light-emitting unit 120 may emit a light to the object 10 to measure the depth of the object 10. The light-emitting unit 120 may emit a light to the object 10 based on a pulse control signal provided form the pulse controller 110. A reflected light reflected from the object 10 may be returned to the lens unit 130. The light-emitting unit 120 may be embodied as a light emitting diode (LED) array or a laser device. Examples of emitted light may include an ultraviolet ray, a infrared ray, a visible ray, and the like.

The lens unit 130 may collect a reflected light reflected from the object 10, and may transmit the collected reflected light to the light-receiving unit 140.

The light-receiving unit 140 may transform the reflected light inputted from the lens unit 130 into electric charge to accumulate the electric charge, and may obtain light information based on an amount of the accumulated electric charge. In this example, the inputted reflected light may be the same as the received reflected light. The light information may be described with reference to FIGS. 4 and 5. The light-receiving unit 140 may receive a reflected light while a waveform of a pulse is in an 'on' state and may accumulate electric charge. The light-receiving unit 140 may be embodied as a photo diode array including pixels arranged in two-dimensional (2D) array or as a photo gate array, as illustrated in FIG. 2.

Figure 3:
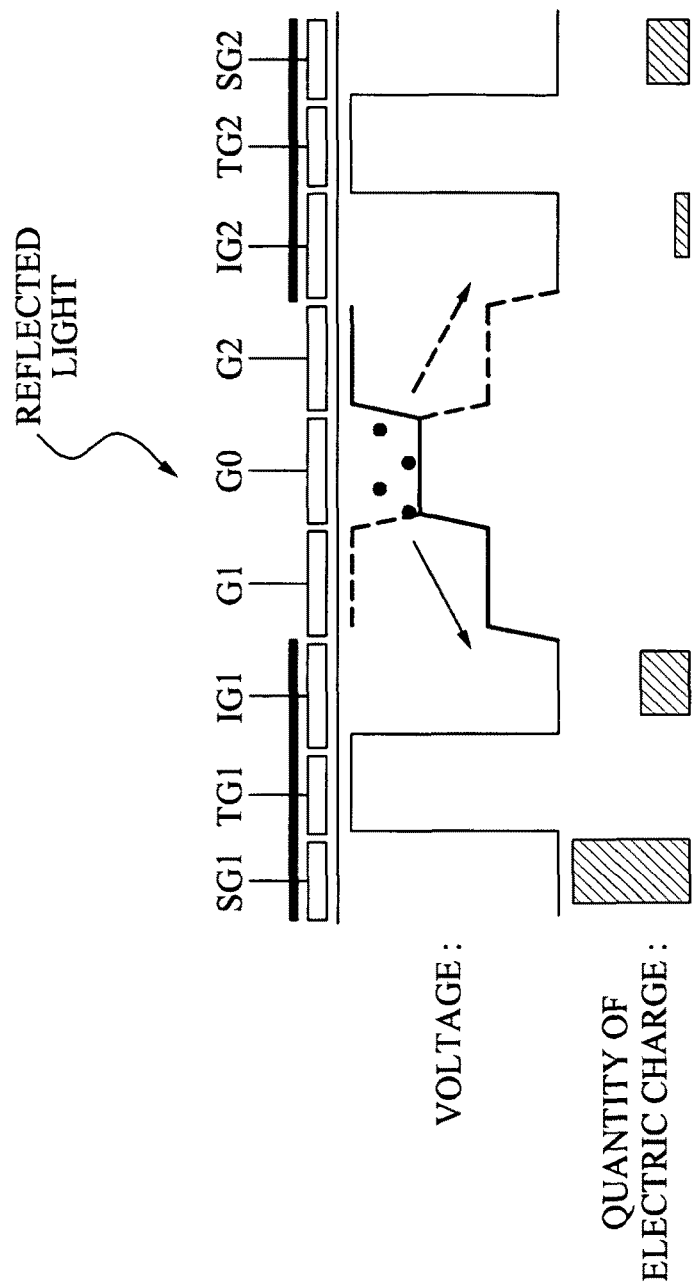
FIG. 3 is a diagram illustrating a configuration of a pixel in a pixel array of a light-receiving unit according to embodiments.

FIG. 3 illustrates a configuration of a pixel in a pixel array of a light-receiving unit 140 according to an embodiment.

The pixel may include a plurality of gates to be used to enable electric charge generated from a reflected light to move (through which electric charge generated from a reflected light may pass?).

A first gate (G1) and a second gate (G2) may receive a reflected light from the lens unit 130 and may generate electric charge. The electric charge may pass through a zero gate (G0), the G1 and the G2, and may move to an integrating gate (IG1) or an integrating gate (IG2). For example, when the G1 is closed and the G2 is open, the electric charge may move to IG1. Electric charge accumulated in IG1 or IG2 may move to a storage gate (SG1) or a storage gate (SG2) via a transmission gate 1 (TG1) or a transmission gate 2 (TG2). The SG1 and the SG2 may be a gate to accumulate electric charge, and a quantity of the accumulated electric charge may be used, by the depth calculator 150, to calculate a depth.

An operation of the light-emitting unit 120 and the light-receiving unit 140 based on a pulse control signal generated by the pulse controller 110 may be described with reference to FIGS. 4 and 5.

Figure 4:
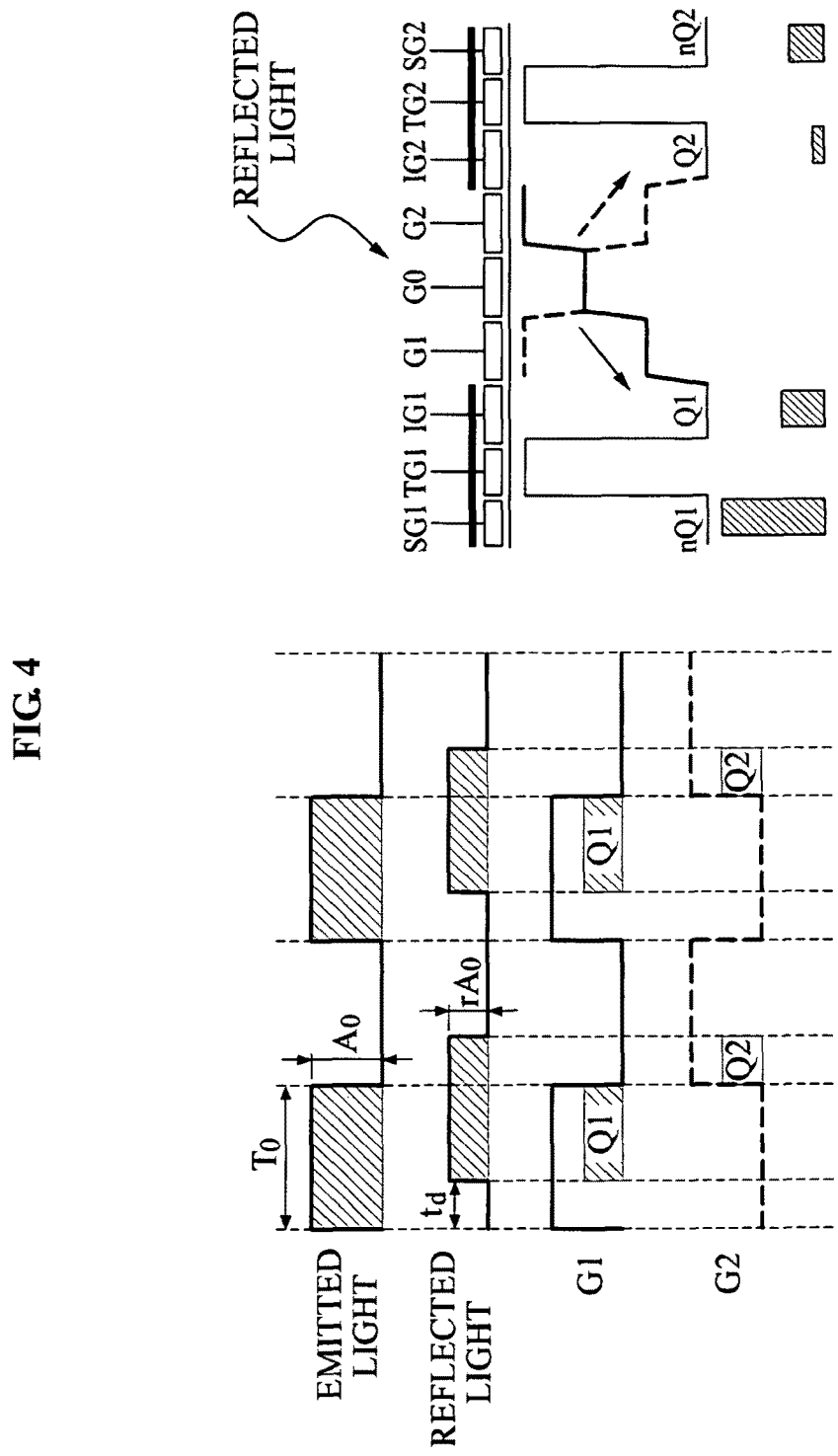
FIGS. 4 and 5 are diagrams illustrating an example of a shuttering time of a G1 and a G2 and a movement of a quantity of electric charge according to embodiments.
Figure 5:
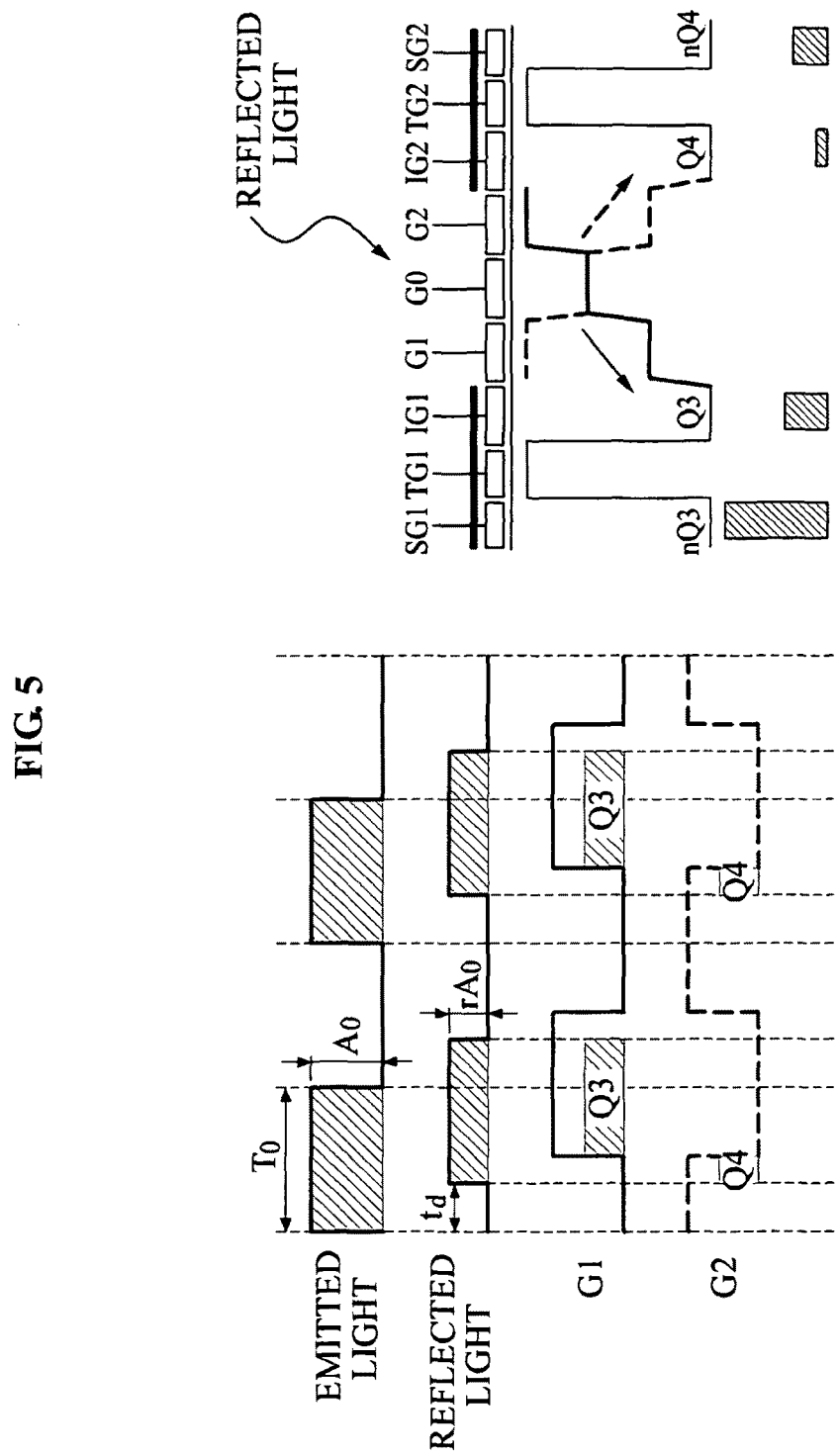

FIGS. 4 and 5 illustrate an example of a shuttering time of a G1 and a G2 and a movement of a quantity of electric charge according to an embodiment.

The pulse controller 110 may provide, to the light-emitting unit 120, a pulse control signal for light emission, to measure a depth of the object 10. The light-emitting unit 120 may emit a light based on an on-off period set in the pulse control signal.

$T_0$ may be a time where a light is emitted from the light-emitting unit 120 during a first period of the pulse. $t_d$ may be a time taken in a round-trip flight of a light, which may be a time where a light is emitted to the object 10 and a reflected light from the object 10 is projected to the light-receiving unit 140. When the pulse control signal provided by the pulse controller 110 is 'on', the light-emitting unit 120 may emit a light to the object 10 during $T_0$, and when the provided pulse control signal is 'off', the light-emitting unit 120 may not emit a light to the object 10.

$A_0$ may denote an intensity of a light emitted by the light-emitting unit 120, r may denote a reflexibility of the object 10, and $rA_0$ may denote an intensity of a reflected light arriving at the light-receiving unit 140. The reflexibility may vary based on a color or a quality of the material of the object 10. At least two quantities of electric charge, namely, Q1 and Q2 may be used to compensate for a distortion due to the reflexibility of the object 10.

Q1 may denote a quantity of electric charge transformed from a reflected light that a G1 receives. Q2 may denote a quantity of electric charge transformed from a reflected light that a G2 receives A shuttering time ($t_s$) may be a time where the G1 or the G2 is open during a single period. Therefore, a first and a second pulse control signal may be a signal to control $t_s$.

Referring to FIG. 4, the pulse controller 110 may provide, to the G1 of the light-receiving unit 140, the first pulse control signal that is a control signal of a first pulse for receiving a reflected light, and may provide, to the G2 (of the light receiving unit 140?), the second pulse control signal that is a control signal of a second pulse. In this example, the pulse controller 110 may simultaneously provide the first pulse control signal and the second pulse control signal to the G1 and the G2, respectively. A phase difference between the second pulse control signal and the first pulse control signal may exist. For example, the phase difference between the first and the second pulse control signals may be 180 degrees.

Specifically, the pulse controller 110 may emit a light, and may turn the G1 on to enable the G1 to receive a reflected light generated by the emitted light. Therefore, the pulse controller 110 may provide, to the G1, the first pulse control signal of which $T_0$ is the same as $t_s$ of the G1, which means that an on-off period of the first pulse control signal is the same as an on-off period of light emission.

The G1 may receive a reflected light during ($T_0$-$t_d$), after $t_d$. The IG1 may obtain first light information (nQ1) from a reflected light of a light emitted based on the first pulse control signal. The nQ1 may be a total quantity of electric charge transformed from the reflected light that the G1 receives.

The pulse controller 110 may turn the G1 off, when the light emission is turned off, and may simultaneously turn the G2 on to enable the G2 to receive a reflected light. In this example, the turning off of the G1 indicates closing of the G1 and the turning on of the G2 indicates opening of the G2. The pulse controller 110 may provide, to the G2, the second pulse control signal having a phase difference of 180 degrees with the first pulse control signal. The IG2 may obtain second light information (nQ2) from a reflected light of a light emitted based on the second pulse control signal. The nQ2 may be a total quantity of electric charge transformed from the reflected light that the G2 receives.

A first measurement measures, during a predetermined time, the quantities of electric charge generated in the G1 and the G2, namely, the nQ1 and the nQ2. The nQ1 and the nQ2 may pass through IG1→TG1→SG1 and IG2→TG2→SG2, respectively, and may be stored in a frame memory. The total quantities of electric charge stored in the frame memory may be nQ1 and nQ2. In this example, n may denote a number of opens of G1 or G2, or may denote a number of turning-'on's of the first pulse control signal or the second pulse control signal.

When the first pulse control signal and the second pulse control signal are provided to the G1 and the G2, during a predetermined time, the pulse controller 110 may operates as illustrated in FIG. 5.

Referring to FIG. 5, the pulse controller 110 may provide, to the G1, a third pulse control signal that is a control signal of a third pulse to receive a reflected light, and may provide, to the G2, a fourth pulse control signal that is a control signal of a fourth pulse. In this example, the pulse controller 110 may simultaneously provide the third pulse control signal and the fourth pulse control signal to the G1 and the G2, respectively.

A phase difference between the third pulse control signal and the fourth control signal may exist. For example, the phase difference between the third pulse control signal and the fourth control signal may be 180 degrees. Also, a predetermined phase difference, for example, a phase difference of 90 degrees between the first pulse control signal and the third pulse control signal may exist, and a phase difference of 90 degrees between the second pulse control signal and the fourth pulse control signal may exist.

The pulse controller 110 may provide, to the G1, the third pulse control signal that turns the G1 on $$\frac{T_0}{2}$$

after emission of a light. Therefore, $$\frac{T_0}{2}$$

after the light is emitted, the pulse controller 110 may provide, to the G1, the third pulse control signal that enables the to receive a reflected light. The IG1 may obtain third light information (nQ3) from a reflected light of a light emitted based on the third pulse control signal. The nQ3 may be a total quantity of electric charge that is transformed from the reflected light that the G1 receives.

The pulse controller 110 may simultaneously turn the G2 on to enable the G2 to receive a reflected light, when the G1 is turned off. The pulse controller 110 may provide, to the G2, a fourth control signal having a phase difference of 180 degrees with the third pulse control signal. The IG2 may obtain fourth light information (nQ4) from a reflected light of a light emitted based on the fourth pulse control signal. The nQ4 may be a total quantity of electric charge that is transformed from the reflected light that the G2 receives.

A second measurement measures, during a predetermined time, the quantities of electric charge generated in the G1 and the G2, namely, the nQ3 and the nQ4. The nQ3 and the nQ4 may pass through IG1→TG1→SG1 and IG2→TG2→SG2, respectively, and may be stored in a frame memory. The total quantities of electric charge stored in the frame memory may be nQ3 and nQ4.

As described above, the first measurement and the second measurement with respect to the quantities of electric charge based on the first through the fourth control signals of which phases are differences and thus, a maximal measurement distance of a depth may be enhanced more than twice a conventional maximal measurement distance and an accuracy of a measured depth may be maintained or enhanced.

Referring again to FIG. 1, the depth calculator 150 may calculate a depth of the object 10 based on the nQ1 through the nQ4 obtained from the G1 and the G2 of the light-receiving unit 140, namely, based on accumulated total quantity of electric charge. The depth may be calculated based on a pixel unit.

The depth calculator 150 may calculate a first difference (Y1) and a second difference (Y2). The first difference may be a difference between the nQ1 and the nQ2, and the Y2 may be a difference between the nQ3 and the nQ4.

$$Y1 = nQ1 - nQ2$$
$$Y2 = nQ3 - nQ4 \quad \text{[Equation 1]}$$

In Equation 1, nQ1 may denote the first light information obtained by the G1 based on the first pulse control signal, nQ2 may denote the second light information obtained by the G2 based on the second pulse control signal, nQ3 may denote the third light information obtained by the G1 based on the third pulse control signal, and nQ4 may denote the fourth light information obtained by the G2 based on the fourth pulse control signal.

When the Y1 and the Y2 are calculated based on Equation 1, the depth calculator 150 may adaptively calculate the depth based on the calculated Y1 and the calculated Y2.

The depth calculator 150 may calculate, based on difference schemes, the depth for each of a condition where both the Y1 and the Y2 are greater than or equal to zero, a condition where the Y1 is less than zero and the Y2 is greater than or equal to zero, a condition where both the Y1 and the Y2 are less than zero, and a condition where the Y1 is greater than or equal to zero and the Y2 is less than zero.

First, when both the Y1 and the Y2 are greater than or equal to zero, namely, Y1≥0, Y2≥0, the depth calculator 150 may calculate $t_d$ based on Equation 2. $t_d$ may be a time taken in a round-trip flight of a light, which may be a time where a light is emitted to the object 10 and a reflected light from the object 10 is projected to the light-receiving unit 140.

$$t_d = \frac{1}{2} \cdot \left( \frac{Y2}{Y1 + Y2} \right) \cdot T_0 \quad \text{[Equation 2]}$$

Second, when the Y1 is less than zero and the Y2 is greater than or equal to zero, namely, Y1<0, Y2≥0, the depth calculator 150 may calculate $t_d$ based on Equation 3.

$$t_d = \frac{1}{2} \cdot \left( \frac{-2Y1 + Y2}{-Y1 + Y2} \right) \cdot T_0 \quad \text{[Equation 3]}$$

Third, when both the Y1 and the Y2 are less than zero, namely, Y1<0, Y2<0, the calculator 150 may calculate $t_d$ based on Equation 4.

$$t_d = \frac{1}{2} \cdot \left( \frac{2Y1 + 3Y2}{Y1 + Y2} \right) \cdot T_0 \quad \text{[Equation 4]}$$

Fourth, when the Y1 is greater than or equal to zero and the Y2 is less than zero, namely, Y1≥0, Y2<0, the depth calculator 150 may calculate $t_{d\,0}$ based on Equation 5.

$$t_d = \frac{1}{2} \cdot \left( \frac{4Y1 - 3Y2}{Y1 - Y2} \right) \cdot T_0 \quad \text{[Equation 5]}$$

When $t_d$ is calculated based on one of Equation 2 through Equation 5, the depth calculator 150 may calculate a dept of a pixel by substituting the calculated $t_d$ in Equation 6.

$$\text{depth} = \frac{1}{2} \cdot C \cdot t_d \quad \text{[Equation 6]}$$

In Equation 6, the depth may denote the depth of the pixel, C may denote a speed of an emitted light or a reflected light, and $t_d$ may denote time taken in a round-trip flight of a light that is calculated based on one of Equation 2 through Equation 5. C may use a speed of light, for example, $3 \times 10^8$ m/s, which is merely an example. The depth calculator 150 may calculate a depth of each of pixels of the object 10 based on the described method.

The depth image generator unit 160 may generate a depth image corresponding to the object 10 based on the calculated depth of each of the pixels. A depth of a pixel, which may be a distance between the depth image generating apparatus 100 and the corresponding pixel, may be a real number. However, a brightness image of n-bit may be represented by an integer number in a display device. For example, the brightness image of eight-bit may be represented by an integer number in a range between 0 through 255 in the display device. Therefore, the depth image generator 160 may normalize the depth to be eight-bit.

The normalization may be performed based on a maximal distance value that is available in measuring the object 10. For example, when the maximal measurement distance of the depth image generating apparatus 100 is 10 m and the measured depth is 5 m, the depth image generator 160 may normalize the depth into based on eight-bit value. In this example, when 10 m that is the maximal measurement distance is changed into 255 that is a maximal value of the eight-bit value, and 5 m may be changed into 127 or 128.

FIG. 6 illustrates an example of the object 10 and a depth image of the object 10 according to an embodiment. The depth image generator 160 may apply normalization with respect to all pixels, to generate a depth image as illustrated in FIG. 6. A bright portion in the depth image may indicate that a distance between the object 10 and the depth image generating apparatus 100 is relatively short, and a dark portion in the depth image may indicate that a distance between the object 10 and the depth image generating apparatus 100 is relatively long.

Figure 7:
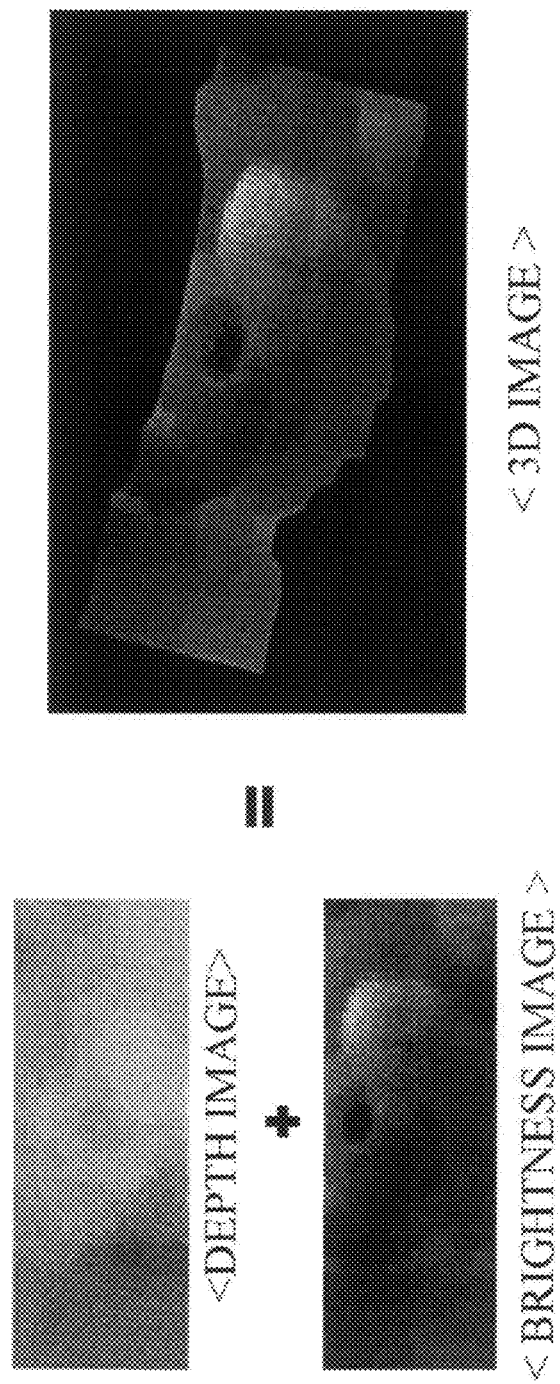
FIG. 7 is a diagram illustrating an example of generating a three-dimensional (3D) image according to embodiments.

FIG. 7 illustrates an example of generating a 3D image according to an embodiment. The 3D image may be generated based on a brightness image of the object 10 and a depth image generated by the depth image generator 160.

A method of generalizing Equation 2 through Equation 5 may be described, Equation 2 through Equation 5 being used to calculate $t_d$ based on an Y1 and an Y2.

FIGS. 8A through 8D illustrate examples of a quantity of electric charge generated based on $t_d$ according to an embodiment.

FIG. 8A illustrates quantities of electric charge generated in a G1 and a G2, namely, nQ1 through nQ4, when $$0 \le t_d < \frac{T_0}{2}.$$

When the Y1 and the Y2 are calculated based on the quantities of electric charge of FIG. 8A, both the Y1 and the Y2 are greater than or equal to zero.

Figure 8B:
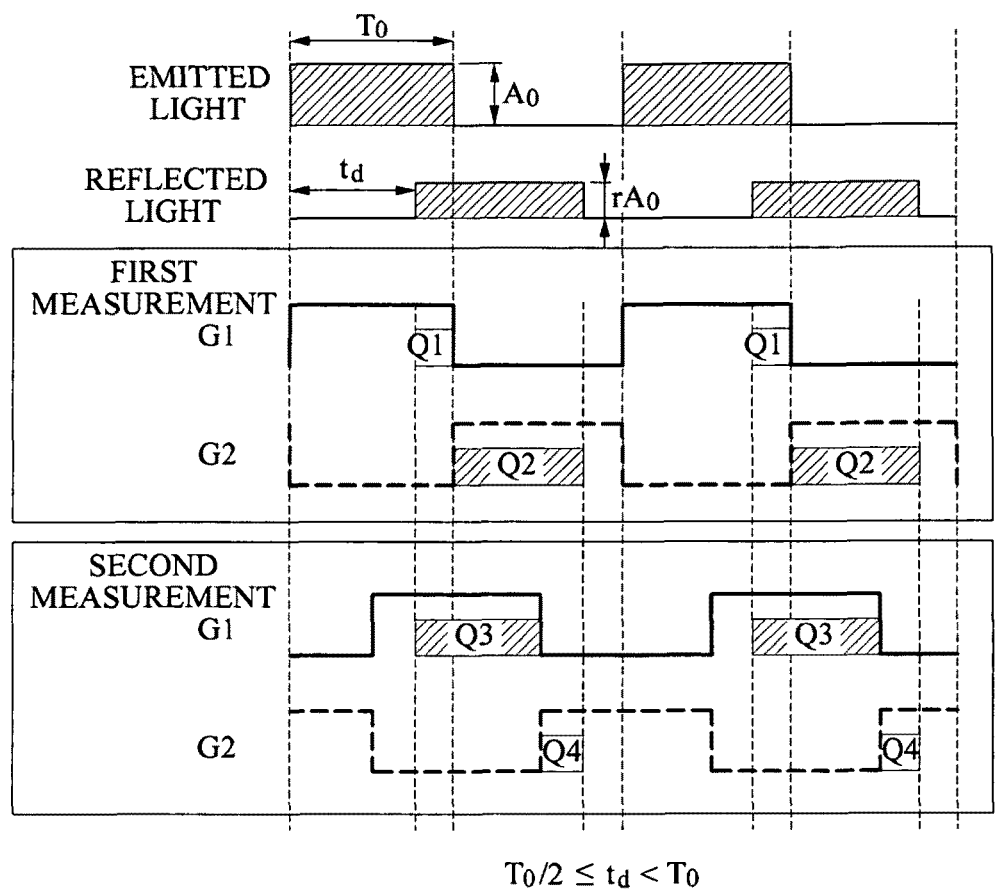

FIG. 8B illustrates quantities of electric charge generated in a G1 and a G2, namely, nQ1 through nQ4, when $$\frac{T_0}{2} \le t_d < T_0.$$

When the Y1 and the Y2 are calculated based on the quantities of electric charge of FIG. 8B, the Y1 is less than zero and the Y2 is greater than or equal to zero.

Figure 8C:
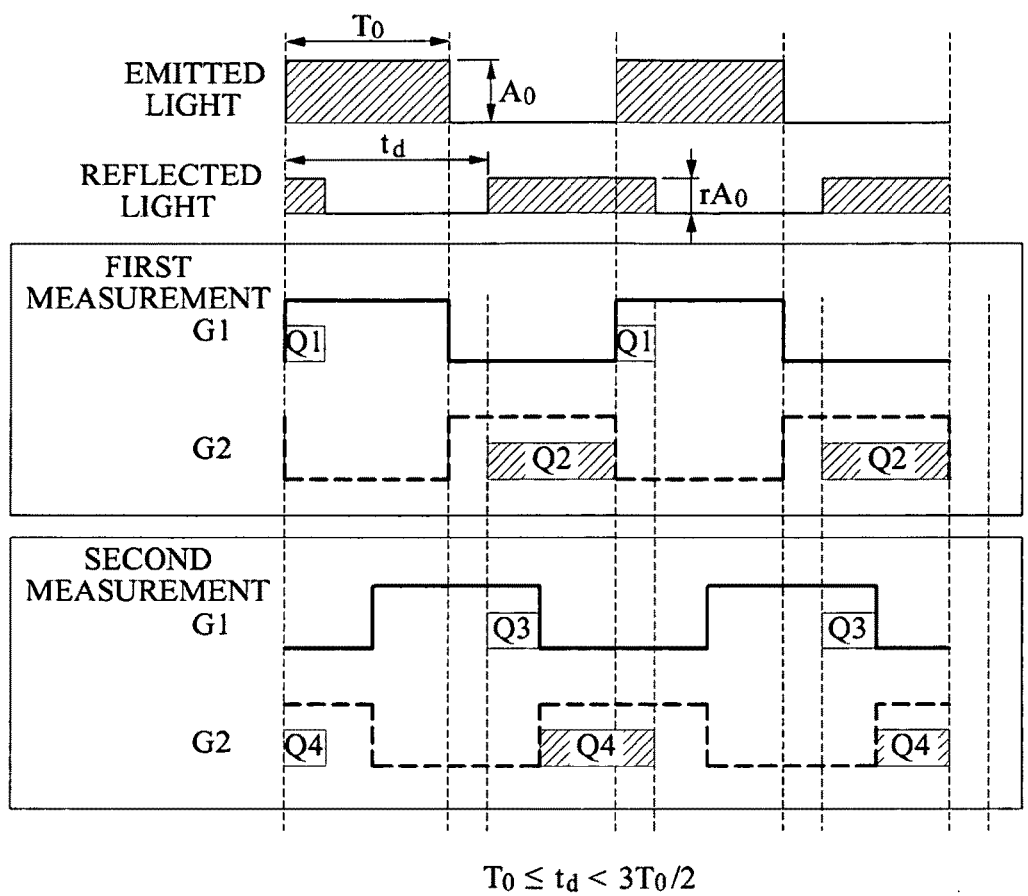

FIG. 8C illustrates quantities of electric charge generated in a G1 and a G2, namely, nQ1 through nQ4, when $$T_0 \le t_d < \frac{3T_0}{2}.$$

When the Y1 and the Y2 are calculated based on the quantities of electric charge of FIG. 8C, both the Y1 and the Y2 are less than zero.

Figure 8D:
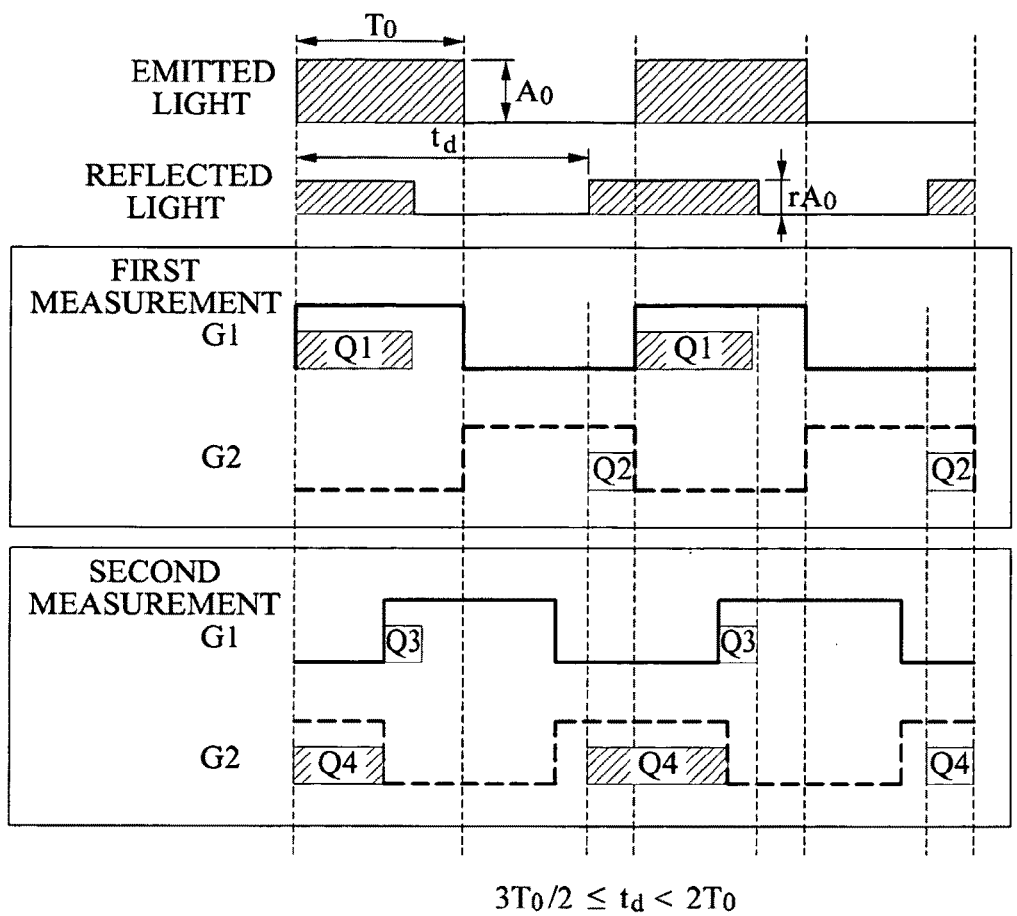

FIG. 8D illustrates quantities of electric charge generated in a G1 and a G2, namely, nQ1 and nQ4, when $$\frac{3T_0}{2} \le t_d < 2T_0.$$

When the Y1 and the Y2 are calculated based on the quantities of electric charge of FIG. 8D, the Y1 is greater than or equal to zero and the Y2 is less than zero.

Figure 9:
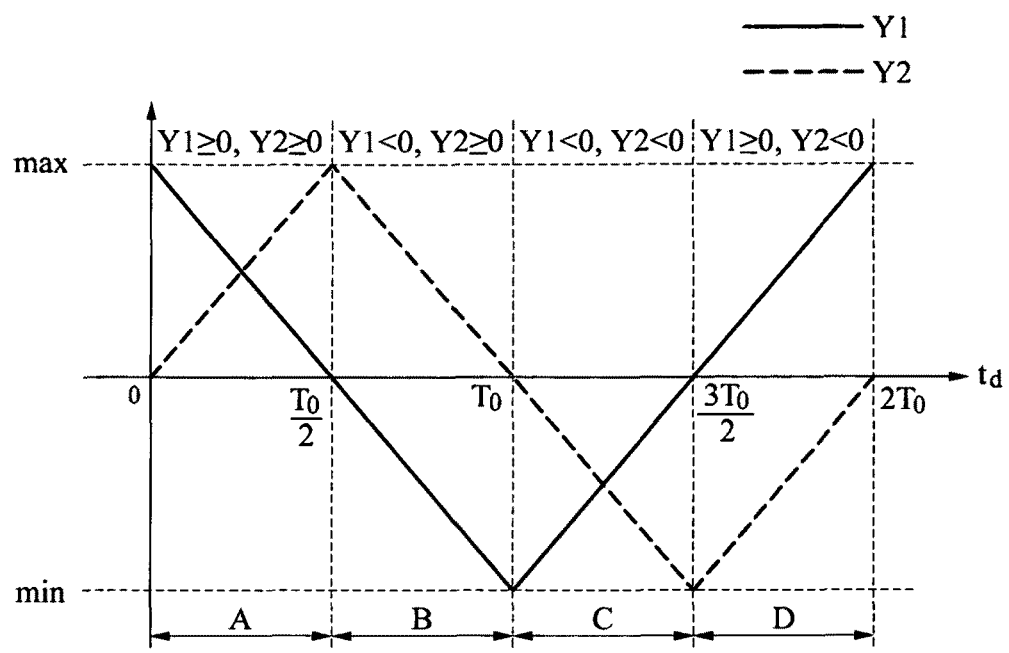
FIG. 9 is a graph illustrating an Y1 and an Y2 varying based on $t_d$ of FIGS. 8A through 8D.

FIG. 9 illustrates a graph with respect to an Y1 and an Y2 varying based on $t_d$ of FIGS. 8A through 8D

Referring to FIGS. 9, A, B, C, and D correspond to FIG. 8A, FIG. 8B, FIG. 8C, and FIG. 8D, respectively. For example, the Y1 and the Y2 in a period A may show a change in the quantities of electric charge of FIG. 8A.

In the period A, the Y1 decreases and the Y2 increases in its initial period where a first pulse control signal and a second pulse control signal are provided to a G1 and a G2, respectively. In a period B, both the Y1 and the Y2 decrease. In a period C, the Y1 increases and the Y2 decreases. In a period D, both the Y1 and the Y2 increase. Accordingly, the Y1 and the Y2 vary based on $t_d$, which may indicate that $t_d$ affects nQ1 through nQ4 obtained by the G1 and the G2.

Therefore, the depth image generating apparatus 100 or a separate operation device may draw, based on the characteristics described in FIG. 9, Equation 2 through Equation 5 to calculate $t_d$. Equation 2 through Equation 5 correspond to the period A through period D, respectively.

Figure 10:
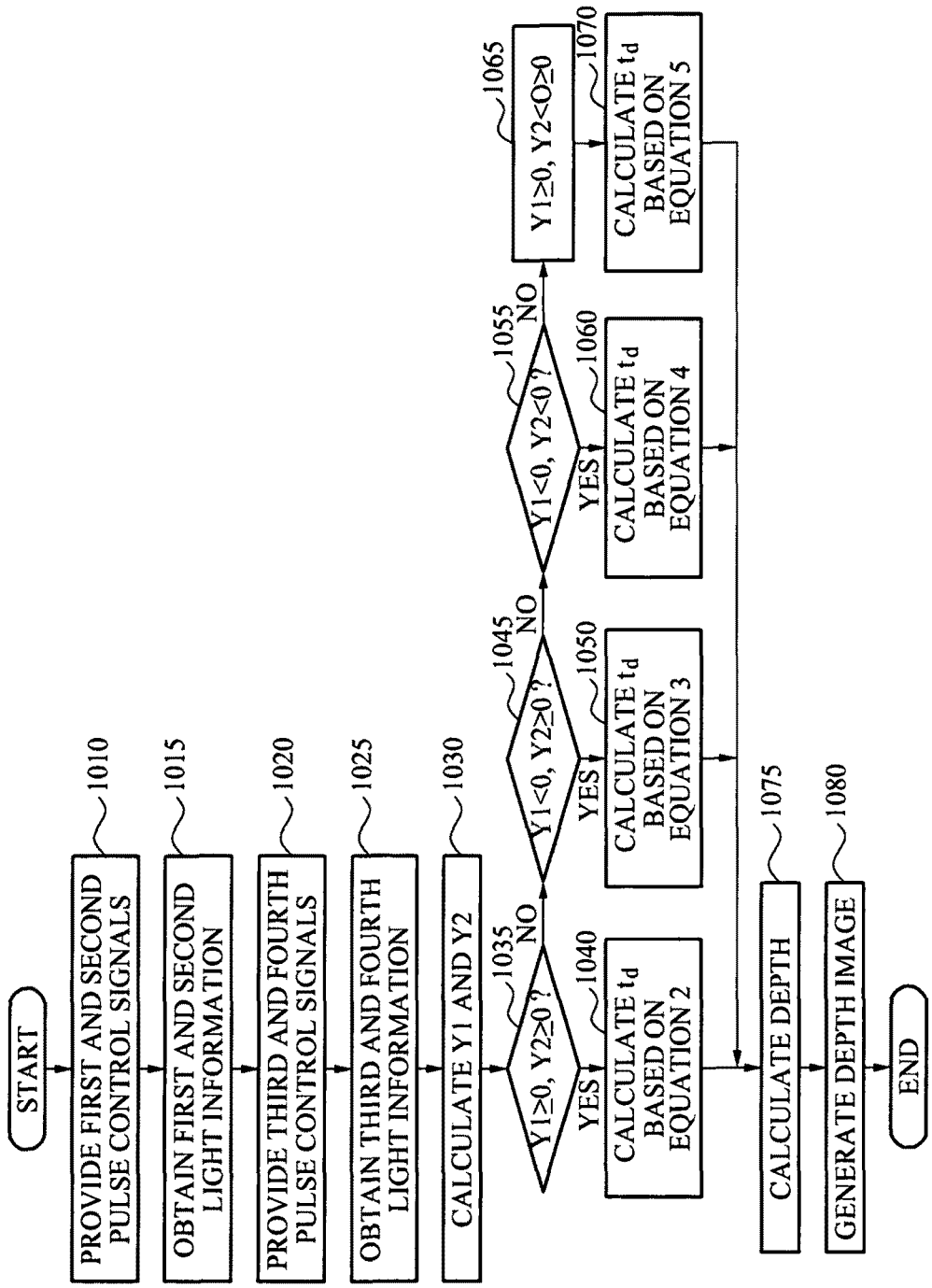
FIG. 10 is a flowchart illustrating a depth image generating method of a depth image generating apparatus according to embodiments.

FIG. 10 illustrates a depth image generating method of a depth image generating apparatus according to an embodiment.

Referring to FIG. 10, the depth image generating method may be performed by the depth image generating apparatus 100 of FIG. 1.

In operation 1010, the depth image generating apparatus 100 provides a first pulse control signal to a G1 of the light-receiving unit 140, and provides a second pulse control signal to a G2, during a predetermined time. The first pulse control signal may have an on-off period same as a pulse provided to the light-emitting unit 120. A phase difference between the first pulse control signal and the second pulse control signal may be 180 degrees. Therefore, the second pulse control signal is turned off, when the first pulse control signal is turned on.

In operation 1015, the depth image generating apparatus 100 obtains nQ1 through the G1 and obtains nQ2 through the G2.

In operation 1020, the depth image generating apparatus 100 provides, to the G1, a third pulse control signal to receive a reflected light, and provide, to the G2, a fourth pulse control signal, during a predetermined time. The third pulse control signal may have a waveform that is to be turned on $T_0/2$ after an emitted light. A phase difference between the third pulse control signal and the fourth pulse control signal may be 180 degrees. Therefore, the fourth pulse control signal may be turned off, when the third pulse control signal is turned on.

In operation 1025, the depth image generating apparatus 100 obtains the nQ3 through the G1 and obtains nQ4 through the G2.

In operation 1030, the depth image generating apparatus 100 calculates an Y1 and an Y2 based on Equation 1, the Y1 being a difference between nQ1 and nQ2 and the Y2 being a difference between nQ3 and nQ4. The Y1 and the Y2 may be used to calculate $t_d$ that is a time taken in round-trip flight of a light to a pixel.

First, when both the Y1 and the Y2 are greater than or equal to zero, namely, Y1≥0, Y2≥0 in operation 1035, the depth image generating apparatus 100 calculates $t_d$ based on Equation 2 in operation 1040.

Second, when the Y1 is less than zero and the Y2 is greater than or equal to zero, namely, Y1<0, Y2≥0 in operation 1045, the depth image generating apparatus 100 calculates $t_d$ based on Equation 3 in operation 1050.

Third, when both the Y1 and the Y2 are less than zero, namely, Y1<0, Y2<0 in operation 1055, the depth image generating apparatus 100 calculates $t_d$ based on Equation 4 in operation 1060.

Forth, when the Y1 is greater than or equal to zero and the Y2 is less than zero, namely, Y1≥0, Y2<0 in operation 1065, the depth image generating apparatus 100 calculates $t_d$ based on Equation 5 in operation 1070.

When $t_d$ is calculated with respect to all pixels through operations 1010 through 1070, the depth image generating apparatus 100 may calculate a depth of each pixel based on the calculated $t_d$ and Equation 6 in operation 1075.

In operation 1080, the depth image generating apparatus 100 normalizes the calculated depth of each pixel to generate a depth image of the object 10.

The depth image generating apparatus 100 and the method thereof may obtain, based on a configuration of a pixel, a quantity of electric charge generated due to a reflected light, and may calculate a depth based on the obtained quantity of electric charge. The depth image generating apparatus 100 and the method thereof may adjust a shuttering time of a gate, such as the G1 and the G2, included in the pixel, to calculate the depth and thus, a maximal measurement distance may be extended without a complexity in operations and an accuracy of the depth may be maintained.

Methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

The non-transitory computer-readable media may also be a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA).

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for generating a depth image, the apparatus comprising:
   a light receiver including a first gate and a second gate; and
   a processor including,
      a depth calculator configured to calculate a depth as the depth of the depth image based on first light information through fourth light information,
   wherein the first gate obtains the first light information from a reflected light of a light emitted based on a first pulse and the second gate obtains the second light information from a reflected light of a light emitted based on a second pulse, and then the first gate obtains the third light information from a reflected light of a light emitted based on a third pulse and the second gate obtains the fourth light information from a reflected light of a light emitted based on a fourth pulse,
   wherein the first pulse, the second pulse, the third pulse, and the fourth pulse are separate from each other,
   wherein the depth calculator is configured to calculate the depth based on a first difference and a second difference, the first difference being a difference between the first light information and the second light information and the second difference being a difference between the third light information and the fourth light information, and
   wherein the depth calculator is configured to select, based on values of the first difference and the second difference, a scheme from among different schemes used to calculate the depth, and calculate the depth using the selected scheme.

2. The apparatus of claim 1, wherein the different schemes include a scheme for each of a condition where both the first difference and the second difference are greater than or equal to zero, a condition where the first difference is less than zero and the second difference is greater than or equal to zero, a condition where both the first difference and the second difference are less than zero, and a condition where the first difference is greater than or equal to zero and the second difference is less than zero.

3. The apparatus of claim 1, further comprising:
   a pulse controller configured to simultaneously provide the first pulse and the second pulse to the first gate and the second gate, respectively, and then, to simultaneously provide the third pulse and the fourth pulse to the first gate and the second gate, respectively.

4. The apparatus of claim 1, wherein a phase difference between the first pulse and the second pulse is 180 degrees, a phase difference between the third pulse and the fourth pulse is 180 degrees, a phase difference between the first pulse and the third pulse is 90 degrees, and a phase difference between the second pulse and the fourth pulse is 90 degrees.

5. The apparatus of claim 4, wherein an on-off period of the first pulse is the same as an on-off period of light emission, and the third pulse is generated after the light emission, and wherein the period of the third pulse is one-half of the period of the first pulse.

6. A method for generating a depth image, the method comprising:

obtaining first light information and second light information respectively from a reflected light of a light emitted based on a first pulse and from a reflected light of a light emitted based on a second pulse;

obtaining third light information and fourth light information respectively from a reflected light of a light emitted based on a third pulse and from a reflected light of a light emitted based on a fourth pulse; and calculating a depth as the depth of the depth image based on the first light information through the fourth light information, wherein the first pulse, the second pulse, the third pulse, and the fourth pulse are separate from each other, and wherein the calculating the depth based on the first light information through the fourth light information includes, selecting, based on values of a first difference and a second difference, a scheme from among different schemes used to calculate the depth, the first difference being a difference between the first light information and the second light information and the second difference being a difference between the third light information and the fourth light information, and calculating the depth using the selected scheme.

7. The method of claim 6, wherein the different schemes include a scheme for each of a condition where both the first difference and the second difference are greater than or equal to zero, a condition where the first difference is less than zero and the second difference is greater than or equal to zero, a condition where both the first difference and the second difference are less than zero, and a condition where the first difference is greater than or equal to zero and the second difference is less than zero.

8. The method of claim 6, wherein the first pulse and the second pulse are simultaneously provided to the first gate and the second gate, respectively, and then, the third pulse and the fourth pulse are simultaneously provided to the first gate and the second gate, respectively.

9. The method of claim 6, wherein a phase difference between the first pulse and the second pulse is 180 degrees, a phase difference between the third pulse and the fourth pulse is 180 degrees, a phase difference between the first pulse and the third pulse is 90 degrees, and a phase difference between the second pulse and the fourth pulse is 90 degrees.

10. The method of claim 9, wherein an on-off period of the first pulse is the same as an on-off period of light emission, and the third pulse is generated after the light emission, and wherein the period of the third pulse is one-half of the period of the first pulse.

11. The method of claim 6, wherein:

the first light information comprises a total quantity of electric charge from the reflected light of the light emitted on the first pulse signal;

the second light information comprises a total quantity of electric charge from the reflected light of the light emitted on the second pulse signal;

the third light information comprises a total quantity of electric charge from the reflected light of the light emitted on the third pulse signal;

the fourth light information comprises a total quantity of electric charge from the reflected light of the light emitted on the fourth pulse signal; and the first difference is between the first total quantity of electric charge and the second total quantity of electric charge, and the second difference is between the third total quantity of electric charge and the fourth total quantity of electric charge.

12. The method of claim 6, further comprising adjusting at least one of a shuttering time of the first gate and a shuttering time of the second gate to extend a maximal measurement distance and to calculate the depth, the shuttering time of the first gate being a time when the first gate is open during a single period, the shuttering time of the second gate being a time when the second gate is open during the single period.

13. At least one non-transitory computer readable recording medium storing computer readable instructions that control at least one processor to implement the method of claim 6.

14. The apparatus of claim 1, wherein the apparatus is included in a depth camera.

15. The apparatus of claim 1, wherein the first and second gates are included in a pixel.

16. The apparatus of claim 1, wherein at least one of a shuttering time of the first gate and a shuttering time of the second gate is adjusted to extend a maximal measurement distance and to calculate the depth of the image, the shuttering time of the first gate being a time when the first gate is open during a single period, the shuttering time of the second gate being a time when the second gate is open during the single period.

17. A method for generating a depth image, the method comprising:

measuring, during a first time, a first total quantity of electric charge in a first gate from a first reflected light of light emitted on a first pulse control signal, and a second total quantity of electric charge in a second gate from a second reflected light of a light emitted on a second pulse control signal;

calculating a first difference between the first total quantity of electric charge and the second total quantity of electric charge;

measuring, during a second time, a third total quantity of electric charge in the first gate from a third reflected light of a light emitted on a third pulse control signal, and a fourth total quantity of electric charge in the second gate from a fourth reflected light of a light emitted on a fourth pulse control signal;

calculating a second difference between the third total quantity of electric charge and the fourth total quantity of electric charge; and calculating a maximal measurement distance of a depth as the depth of the depth image based on the first difference and the second difference, wherein the first pulse, the second pulse, the third pulse, and the fourth pulse are separate from each other, and wherein the calculating the depth includes, selecting, based on values of the first difference and the second difference, a scheme from among different schemes used to calculate the depth, and calculating the depth using selected scheme.

18. The method of claim 17, further comprising adjusting at least one of a shuttering time of the first gate and a shuttering time of the second gate to extend a maximal measurement distance and to calculate the depth of the image, the shuttering time of the first gate being a time when the first gate is open during a single period, the shuttering time of the second gate being a time when the second gate is open during the single period.

19. At least one non-transitory computer readable recording medium storing computer readable instructions that control at least one processor to implement the method of claim 17.

20. The apparatus of claim 1, wherein the different schemes are different equations for calculating the depth.

* * * * *